United States Patent
Kojima et al.

[11] Patent Number: 6,034,642
[45] Date of Patent: Mar. 7, 2000

[54] ANTENNA APPARATUS

[75] Inventors: Jou Kojima; Ken-I-Chi Tohya; Naoto Yamamoto, all of Wako, Japan

[73] Assignee: Honda Giken Kogyo Kabushiki Kaisha, Tokyo, Japan

[21] Appl. No.: 08/961,518

[22] Filed: Oct. 30, 1997

[30] Foreign Application Priority Data

Nov. 1, 1996 [JP] Japan .................................. 8-307310

[51] Int. Cl.$^7$ .................................................. H01Q 19/06
[52] U.S. Cl. ........................ 343/753; 343/755; 343/761; 343/909
[58] Field of Search .................................... 343/753, 754, 343/755, 765, 766, 781 CA, 783, 761, 909, 911 R, 756; H01Q 19/06

[56] References Cited

U.S. PATENT DOCUMENTS

| | | | |
|---|---|---|---|
| 1,931,980 | 10/1933 | Becker | 250/11 |
| 2,452,349 | 10/1948 | Becker | 343/753 |
| 2,531,454 | 11/1950 | Marshall | 250/33.65 |
| 2,595,271 | 5/1992 | Kline | 250/33.65 |
| 3,848,255 | 11/1974 | Migdal | 343/761 |
| 3,936,835 | 2/1976 | Phelan | 343/779 |
| 4,387,391 | 6/1983 | Hecker | 358/109 |
| 4,939,526 | 7/1990 | Tsuda | 343/756 |
| 5,227,784 | 7/1993 | Masamori et al. | 340/903 |
| 5,526,008 | 6/1996 | Meserole | 343/761 |

FOREIGN PATENT DOCUMENTS

| | | |
|---|---|---|
| 0 494 027 A1 | 7/1908 | European Pat. Off. . |
| 0 498 524 A2 | 8/1912 | European Pat. Off. . |
| 0 494 027 A1 | 7/1992 | European Pat. Off. . |
| 0 498 524 A2 | 8/1992 | European Pat. Off. . |
| 0 631 342 A1 | 12/1994 | European Pat. Off. . |
| 196 10 351 A1 | 3/1996 | Germany . |
| 196 10 351 | 9/1996 | Germany . |
| 4-277904 | 10/1992 | Japan . |
| 5-012600 | 1/1993 | Japan . |
| 5-12600 | 1/1993 | Japan . |
| 6-273512 | 9/1994 | Japan . |
| WO 91/09323 | 6/1991 | WIPO . |
| WO 96/36088 | 11/1996 | WIPO . |

OTHER PUBLICATIONS

94 GHz Three–Dimensional Imaging Radar Sensor for Autonomous Vehicles, 8099 IEEE Transactions on Microwave Theory and Techniques, May 1991, No. 5.

*Primary Examiner*—Don Wong
*Assistant Examiner*—Tho Phan
*Attorney, Agent, or Firm*—Lyon & Lyon LLP

[57] ABSTRACT

An antenna apparatus for use as in an automobile collision warning system has a primary radiator for radiating a high-frequency radio wave beam, a reflecting member for reflecting the radio wave beam, an actuating mechanism for actuating the reflecting member, and a lens such as a dielectric lens for converging the radio wave beam reflected by the reflecting member to reduce an angle of divergence of the radio wave beam.

18 Claims, 7 Drawing Sheets

ANTENNA APPARATUS

BACKGROUND OF THE INVENTION

1. Field of the Invention

The present invention relates to an antenna apparatus for use in a millimeter-wave radar system on automobiles.

2. Description of the Prior Art

Millimeter-wave radar systems have been developed for incorporation in automobile collision warning systems. The millimeter-wave radar system on an automobile scans a surrounding area with a radio wave beam to detect the distance up to a reflective object (hereinafter also referred to as a "target") such as a preceding automobile and the direction (hereinafter also referred to as "bearing") of the target as viewed from the automobile that is equipped with the millimeter-wave radar system. Furthermore, the radio wave beam scanning is carried out for not only detecting the distance and bearing of the target, but also expanding and changing a range in which to detect the target as the automobile is turning. Consequently, the millimeter-wave radar system effects the radio wave beam scanning to serve multiple purposes.

Basically, electronic and mechanical radio wave beam scanning schemes have been known in the art. The electronic radio wave beam scanning systems include a system which has a plurality of antennas that successively radiate radio wave beams, respectively, and a system known as a phased array comprising a plurality of radiating elements for generating a radiation pattern whose direction is changed by changing the phases of currents supplied to the radiating elements.

One mechanical radio wave beam scanning system has a rotatable transmitter/receiver unit including an antenna as disclosed in Japanese laid-open patent publication No. 6-273512. Japanese laid-open patent publication No. 7-154126 reveals another mechanical radio wave beam scanning system which has a main reflecting mirror for converging and radiating a radio wave beam that has been scanned by another reflecting mirror.

The electronic radio wave beam scanning systems are relatively large in size and expensive to manufacture because they require a plurality of antennas or elements.

Some of the mechanical radio wave beam scanning systems have a large moving assembly with a large moment of inertia. Therefore, they impose a large burden on the mechanism which actuates the large moving assembly, making it difficult to scan the radio wave beam at a high speed. In order to reduce the size of the moving assembly, it has been proposed to install a primary radiator disposed in confronting relation to the main reflecting mirror and actuate a small-size reflector positioned between primary radiator and the main reflecting mirror. According to the proposed arrangement, the primary radiator and an actuator mechanism for actuating the reflector are positioned in front of the main reflecting mirror. Consequently, the actuator mechanism tends to block the radio wave beam radiated from the main scanning mirror, adversely affecting the beam radiation characteristics of the antenna.

SUMMARY OF THE INVENTION

It is therefore an object of the present invention to provide an antenna apparatus having a beam scanning mechanism which is small in size and inexpensive to manufacture, operates at a high speed, and has good beam radiation characteristics.

To achieve the above object, there is provided in accordance with an aspect of the present invention an antenna apparatus comprising a primary radiator for radiating a high-frequency radio wave beam, a reflecting member for reflecting the radio wave beam, an actuating mechanism for actuating the reflecting member, and a lens for converging the radio wave beam reflected by the reflecting member to reduce an angle of divergence of the radio wave beam.

According to another aspect of the present invention, there is provided an antenna apparatus comprising a primary radiator for radiating a high-frequency radio wave beam, an auxiliary lens for converging the radio wave beam radiated by the primary radiator to reduce a diameter of the radio wave beam, a reflecting member for reflecting the radio wave beam converged by the auxiliary lens, an actuating mechanism for actuating the reflecting member, and a lens for converging the radio wave beam reflected by the reflecting member to reduce an angle of divergence of the radio wave beam.

According to still another aspect of the present invention, there is provided an antenna apparatus comprising a primary radiator for radiating a high-frequency radio wave beam, and a lens for converging the radio wave beam radiated by the primary radiator to reduce a diameter of the radio wave beam progressively along a direction in which the radio wave beam is propagated for thereby focusing the radio wave beam on a target to be detected.

According to yet still another aspect of the present invention, there is provided an antenna apparatus comprising a primary radiator for radiating a high-frequency radio wave beam, a reflecting member for reflecting the radio wave beam, an actuating mechanism for actuating the reflecting member, and a main lens for converging the radio wave beam reflected by the reflecting member to reduce a diameter of the radio wave beam progressively along a direction in which the radio wave beam is propagated for thereby focusing the radio wave beam forwardly of the main lens.

According to a further aspect of the present invention, there is provided an antenna apparatus comprising a primary radiator for radiating a high-frequency radio wave beam, an auxiliary lens for converging the radio wave beam radiated by the primary radiator to reduce a diameter of the radio wave beam, a reflecting member for reflecting the radio wave beam converged by the auxiliary lens, an actuating mechanism for actuating the reflecting member, and a main lens for converging the radio wave beam reflected by the reflecting member to reduce a diameter of the radio wave beam progressively along a direction in which the radio wave beam is propagated for thereby focusing the radio wave beam forwardly of the main lens.

The antenna apparatus may be used on a motor vehicle, and the actuating mechanism may comprise a rotating mechanism for changing an angle of the reflecting member depending on a turn of the motor vehicle. The turn of the motor vehicle is detected based on a steering angle and a yaw rate of the motor vehicle.

The actuating mechanism may comprise a rotating mechanism for changing an angle of the reflecting member depending on a movement of a detected target. The antenna apparatus may be used on a motor vehicle, and the movement of the detected target may be represented by a relative speed between the motor vehicle and the target, a distance between the motor vehicle and the target, and a position of the target with respect to the motor vehicle.

The reflecting member may comprise a polyhedral body having a plurality of reflecting facets inclined at different angles to planes containing an axis about which the polyhedral body is rotatable. The antenna apparatus may be used on a motor vehicle, and the actuating mechanism may comprise means for selecting one of the reflecting facets to reflect the radio wave beam depending on a tilted condition of the motor vehicle based on a detected pitching angle of the motor vehicle.

The antenna apparatus may be used on a motor vehicle, and may further comprise a lens displacing mechanism for displacing the auxiliary lens in a direction of travel of the radio wave beam depending on a running condition of the motor vehicle. The running condition may comprise a speed of the motor vehicle.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
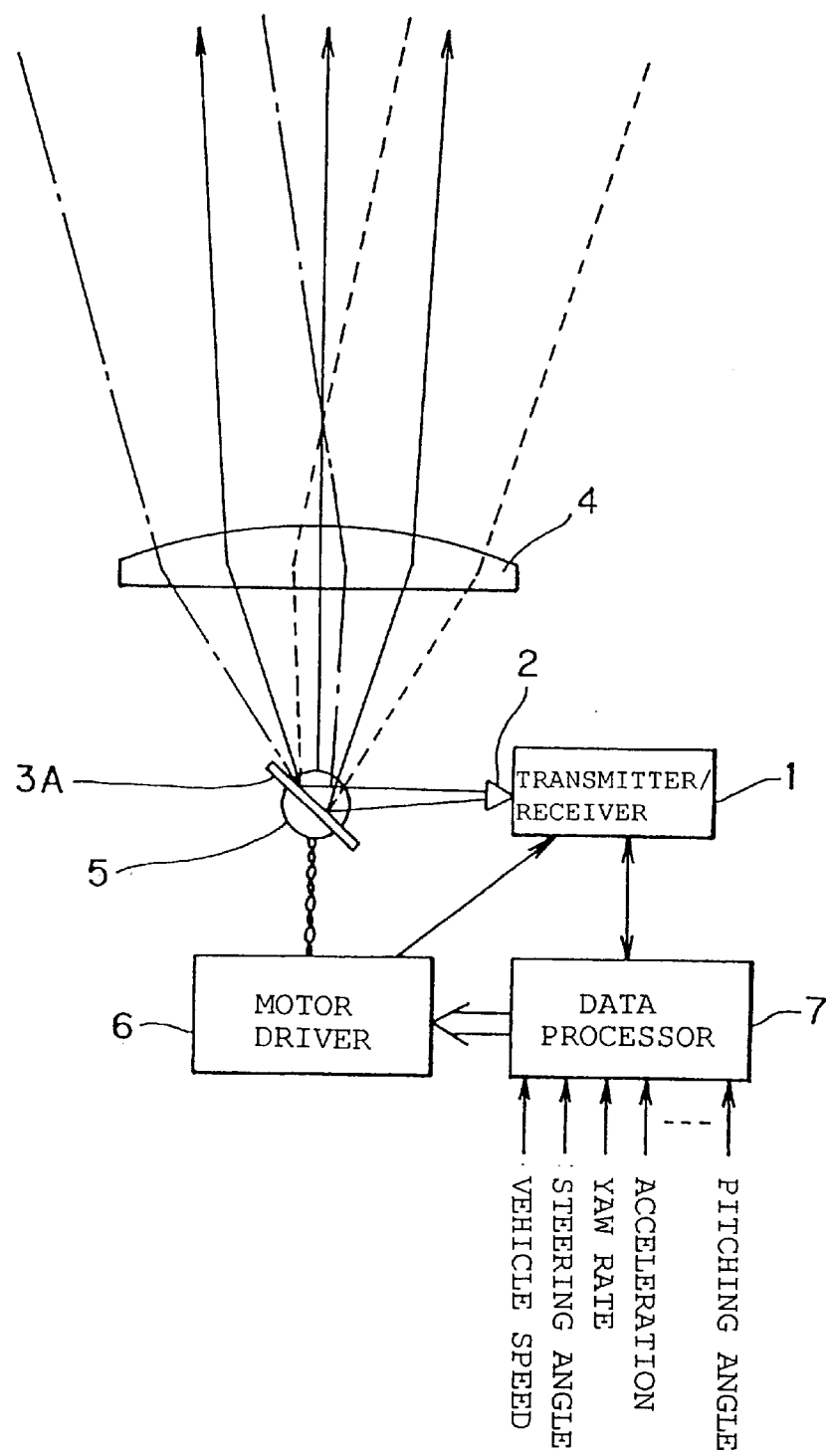
FIG. 1 is a view, partly in block form, of an antenna apparatus according to an embodiment of the present invention.

Like or corresponding parts are denoted by like or corresponding reference numerals and representations throughout views.

As shown in FIG. 1, an antenna apparatus according to an embodiment of the present invention comprises a millimeter-wave transmitter/receiver 1, a primary radiator 2, a reflecting plate 3A, a dielectric lens (dielectric lens antenna) 4, a motor 5, a motor driver 6, and a data processor 7.

The antenna apparatus is typically incorporated in an FM radar system on a front end of a motor vehicle such as an automobile behind a bumper thereof, and directed forwardly of the automobile for detecting the distance up to and the direction or bearing of a target that is usually another automobile running in front of the automobile.

The transmitter/receiver 1 comprises an FM signal generator for generating an FM signal whose frequency varies with time in a triangular pattern about a central frequency of about 30 GHz, and a frequency doubler for doubling the frequency of the FM signal into an FM frequency of about 60 GHz in the millimeter frequency range. The FM signal generator comprises a high-frequency oscillator such as an amplitude-modulated gunn diode and a nonlinear element such as a varactor diode.

The primary radiator 2 comprises a small-size antenna such as an aperture antenna which may be a conical horn antenna, or a planar array antenna disposed on a microstrip substrate.

The reflecting plate 3A has a reflecting surface comprising a flat mirror-finished metal plate, and has its center fixedly mounted on a rotatable shaft projecting upwardly from the center of the motor 5 which may a cylindrical stepping motor.

The dielectric lens 4 is made of a dielectric material of good high-frequency characteristics (small tan δ) such as polytetrafluoroethylene (PTFE) known as Teflon (trademark of Du Pont) or alumina (aluminum oxide).

A millimeter-wave FM signal generated by a transmitting section of the transmitter/receiver 1 is radiated as a radio wave beam from the primary radiator 2. The radiated radio wave beam is reflected by the reflecting surface of the reflecting plate 3A toward the dielectric lens 4. The radio wave beam which is applied to the dielectric lens 4 is converged, i.e., reduced in its angle of divergence, by the dielectric lens 4, and radiated forwardly of the automobile. When the angle of the reflecting plate 3A is changed by the motor 5, the radio wave beam radiated from the antenna apparatus changes its direction to forward, right, and left directions as indicated by the solid lines, dotted lines, and dot-and-dash lines.

The data processor 7 processes various items of information indicative of running conditions of the automobile, including a vehicle speed, a steering angle, a yaw rate, an acceleration, a pitching angle, etc., supplied from various sensors on the automobile. Based on the processed items of information, the data processor 1 determines a direction in which to radiate the radio wave beam, and then issues a control command to the motor driver 6 to control the angle of rotation of the motor 5 for directing the radio wave beam depending on the determined direction.

While the automobile is running straight as detected on the steering angle and the yaw rate, the radio wave beam is radiated head on straight forwardly of the automobile as indicated by the solid lines. When a right turn of the automobile is detected, the direction of the radio wave beam is changed to the right direction as indicated by the dotted lines. When a left turn of the automobile is detected, the direction of the radio wave beam is changed to the left direction as indicated by the dot-and-dash lines. The direction of the radio wave beam may also be controlled by the reflecting plate 3A depending on motion of a target such as a preceding automobile, e.g., the relative speed between the preceding automobile and the automobile with the antenna apparatus, the distance between the preceding automobile and the automobile with the antenna apparatus, and the bearing of the preceding automobile as viewed from the automobile with the antenna apparatus. When the radiated radio wave is reflected by the target in front of the automobile, the reflected wave passes through the dielectric lens 4, is reflected by the reflecting plate 3A, and is applied through the primary radiator 2 to the transmitter/receiver 1 in which the reflected wave is supplied to a receiving section thereof.

The radiated radio wave may be oscillated back and forth to scan a desired area in front of the automobile. For example, while the automobile is running straight, the radio wave beam may be oscillated back and forth in predetermined periodic cycles between the right direction indicated by the dotted lines and the left direction indicated by the dot-and-dash lines to detect obstacles in a relatively wide range forward of the automobile. At this time, the motor 5 may be controlled so as to be angularly moved alternately clockwise and counterclockwise in a certain angular range. While the reflecting surface of the reflecting plate 3A is facing away from the transmitter/receiver 1, the transmitter/receiver 1 may be controlled not to radiate a radio wave beam based on a signal indicative of the angular displacement of the motor 5 from the motor driver 6.

Figure 2:
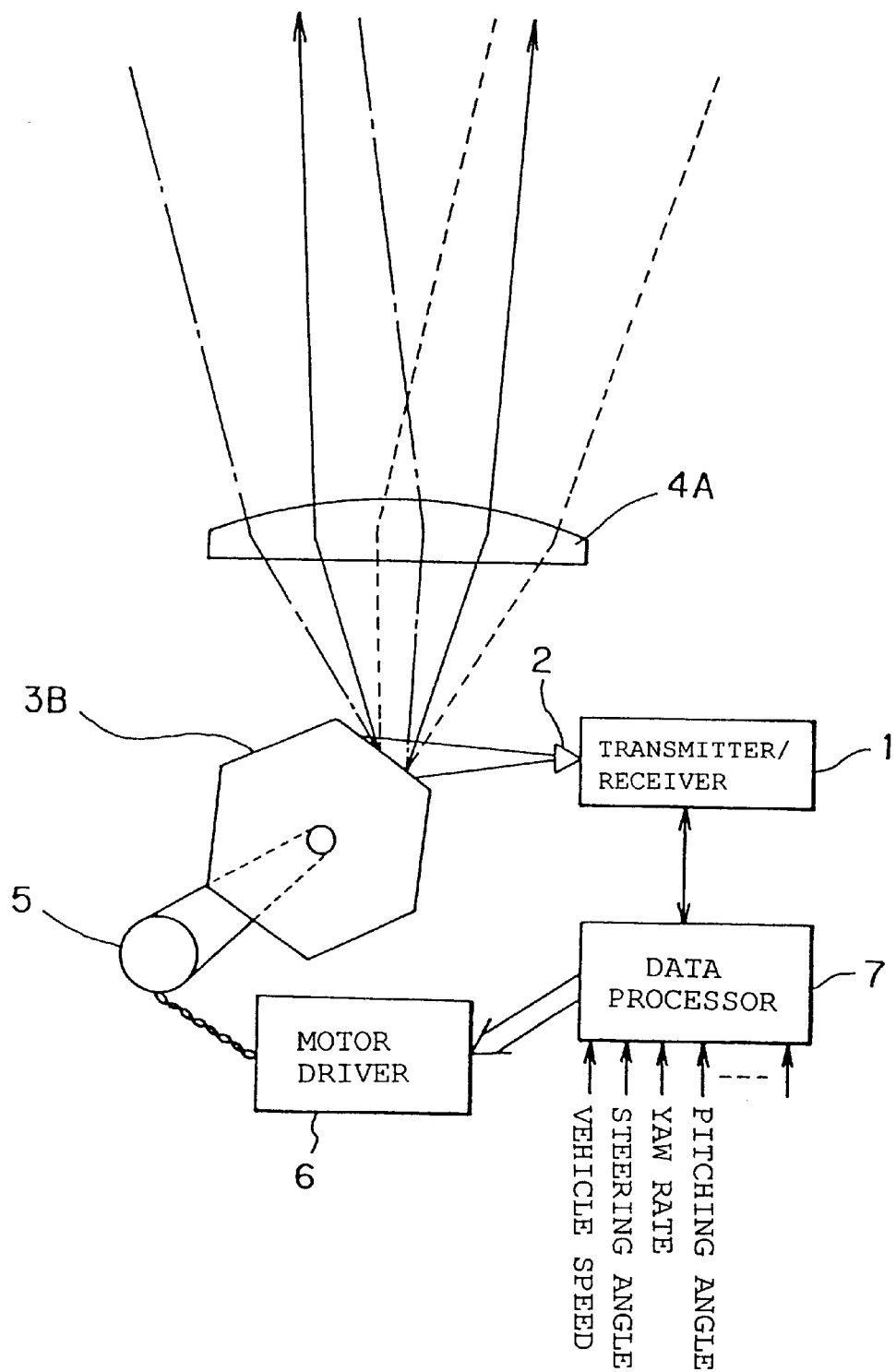
FIG. 2 is a view, partly in block form, of an antenna apparatus according to another embodiment of the present invention.

FIG. 2 shows an antenna apparatus according to another embodiment of the present invention. Those parts shown in FIG. 2 which are denoted by reference numerals that are identical to those shown in FIG. 1 are identical to those which have been described above with reference to FIG. 1, and will not be described in detail below.

The antenna apparatus shown in FIG. 2 differs from the antenna apparatus shown in FIG. 1 in that a reflecting member for reflecting the radio wave beam radiated from the primary radiator 2 comprises a polygonal mirror 3B, and a dielectric lens 4A comprises a circular convex lens.

Figure 3:
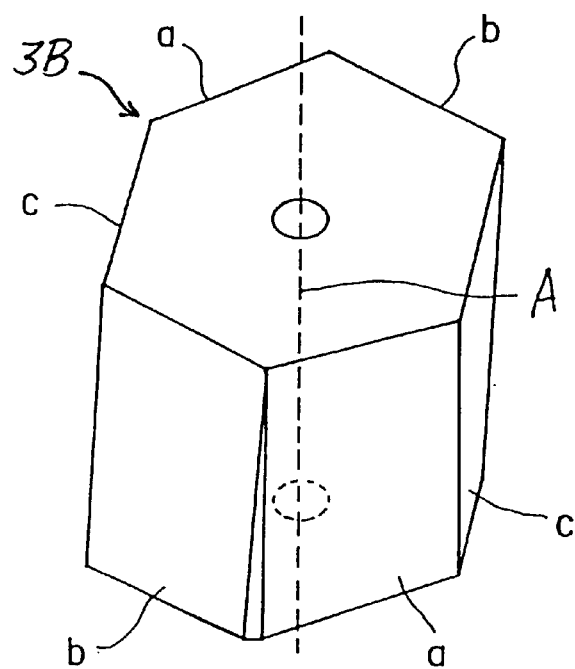
FIG. 3 is a perspective view of a polygonal mirror in the antenna apparatus shown in FIG. 2.

As shown in FIG. 3, the polygonal mirror 3B is substantially in the shape of a hexagonal prism. The polygonal mirror 3B is not in the shape of an exact hexagonal prism because it has two diagonally opposite facets "a" parallel to its central axis A, two diagonally opposite facets "b" inclined +2° to a plane containing the central axis A, and two diagonally opposite facets "c" inclined −2° to a plane containing the central axis A, these facets "a", "b", "c" alternating with each other in the circumferential direction of the polygonal mirror 3B.

Figure 4:
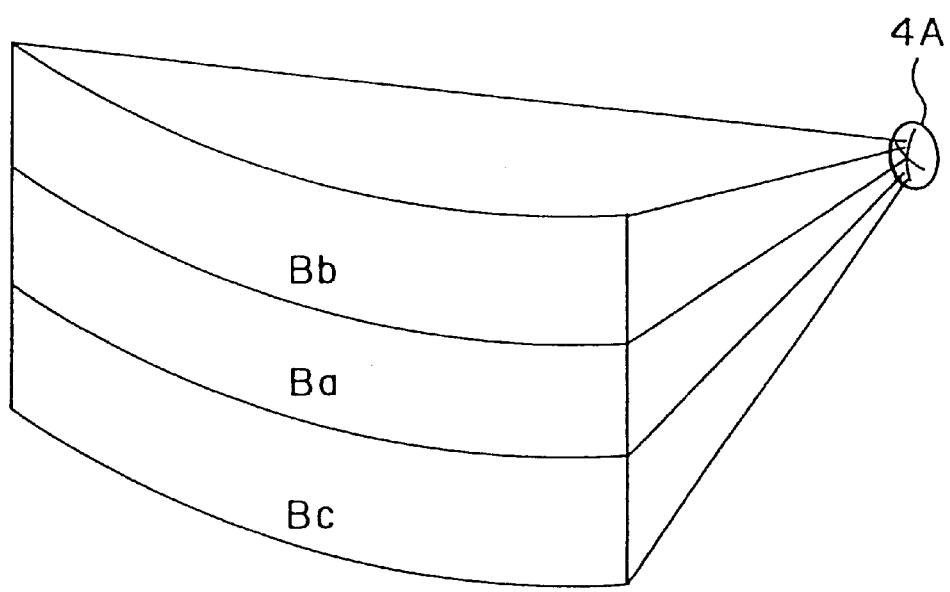
FIG. 4 is a view showing a range covered by a radio wave beam radiated by the antenna apparatus shown in FIG. 2.

Therefore, as shown in FIG. 4, when the polygonal mirror 3B is rotated in one direction about the central axis which lies vertically, the radio wave beam scans a horizontal plane Ba when it is reflected by one of the facets "a" of the polygonal mirror 3B, scans an upper horizontal plane Bb that is tilted +2° from the horizontal plane BA when the radio wave beam is reflected by a next one of the facets "b" of the polygonal mirror 3B, and scans a lower horizontal plane Bc that is tilted −2° from the horizontal plane Ba when the radio wave beam is reflected by a next one of the facets "c" of the polygonal mirror 3B. As the polygonal mirror 3B is continuously rotated, the radio wave beam reflected thereby repeatedly scans the horizontal planes Ba, Bb, Bc successively, thereby scanning a three-dimensional space made of those horizontal planes Ba, Bb, Bc.

Alternatively, rather than rotating the polygonal mirror 3B about the vertical central axis, one of the facets "a", "b", "c" may be selected depending on the detected pitching angle of the automobile for thereby adjusting the tilt of the radio wave beam in the vertical direction when the automobile is running on an uphill or downhill road. At the same time, the horizontal direction of the radio wave beam may be adjusted by adjusting the tilt of the selected one of the facets "a", "b", "c" with respect to the transmitter/receiver 1.

Figure 5:
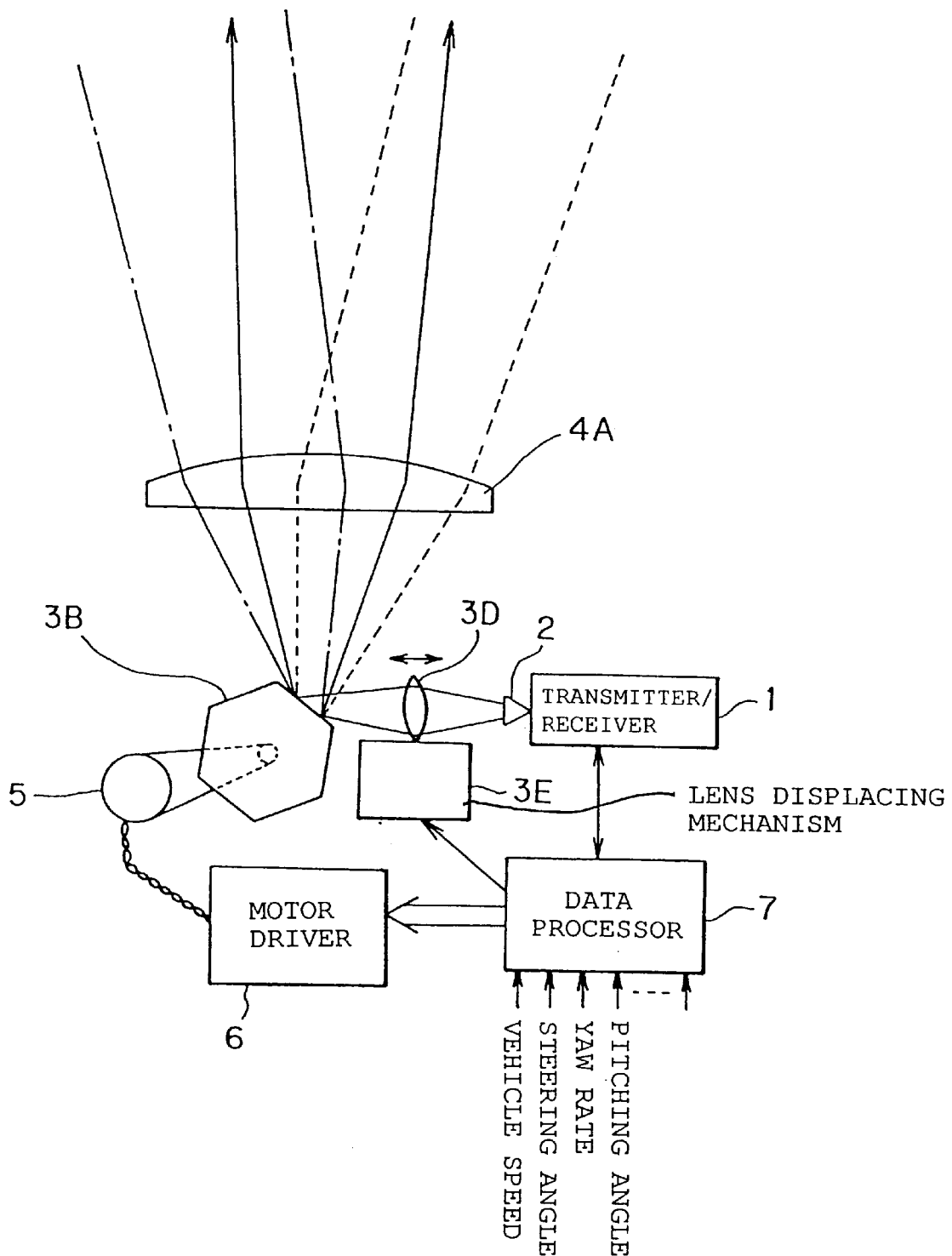
FIG. 5 is a view, partly in block form, of an antenna apparatus according to still another embodiment of the present invention.

FIG. 5 shows an antenna apparatus according to still another embodiment of the present invention. Those parts shown in FIG. 5 which are denoted by reference numerals that are identical to those shown in FIG. 2 are identical to those which have been described above with reference to FIG. 2, and will not be described in detail below.

The antenna apparatus shown in FIG. 5 differs from the antenna apparatus shown in FIG. 2 in that an auxiliary dielectric lens 3D connected to a lens displacing mechanism 3E is movably positioned between the transmitter/receiver 1 and the polygonal mirror 3B, which is made smaller in size than the polygonal mirror 3B shown in FIG. 2 because of the auxiliary dielectric lens 3D. The auxiliary dielectric lens 3D comprises a convex lens.

The radio wave beam radiated from the primary radiator 2 is converged by the auxiliary dielectric lens 3D and applied thereby to the polygonal mirror 3B. Since the radio wave beam is converged by the auxiliary dielectric lens 3D, the beam spot on the polygonal mirror 3B is smaller in diameter than the beam spot on the polygonal mirror 3B shown in FIG. 2. As a result, the facets of the polygonal mirror 3B and hence the polygonal mirror 3B itself may be smaller in size than the polygonal mirror 3B shown in FIG. 2. Consequently, the polygonal mirror 3B and possibly the motor 5 for actuating the polygonal mirror 3B are reduced in size and can operate at a higher speed.

When the auxiliary dielectric lens 3D is moved toward and away from the polygonal mirror 3B by the lens displacing mechanism 3E, the angle of divergence of the radio wave beam applied to the facets of the polygonal mirror 3B and hence the angle of divergence of the radio wave beam radiated from the dielectric lens 4A are varied. The data processor 7 controls the lens displacing mechanism 3E to change the position of the auxiliary dielectric lens 3D relatively to the polygonal mirror 3B depending on the vehicle speed of the automobile. For example, when the vehicle speed of the automobile increases, the angle of divergence of the radio wave beam radiated from the dielectric lens 4A is reduced to enable the radio wave beam to reach a farther point away from the automobile.

Figure 6:
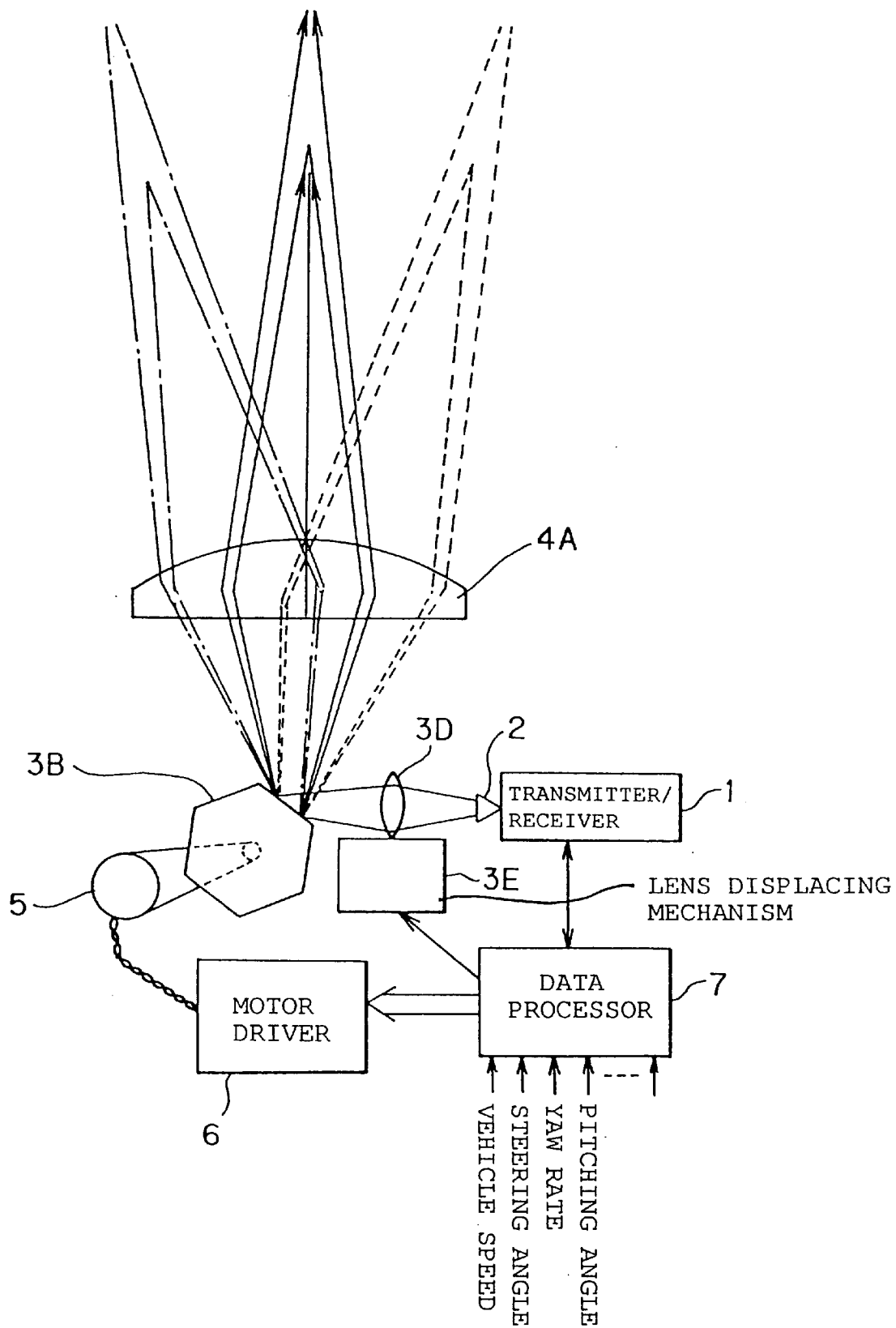
FIG. 6 is a view, partly in block form, of an antenna apparatus according to yet still another embodiment of the present invention.

FIG. 6 shows an antenna apparatus according to yet still another embodiment of the present invention. Those parts shown in FIG. 6 which are denoted by reference numerals that are identical to those shown in FIG. 5 are identical to those which have been described above with reference to FIG. 5, and will not be described in detail below.

The antenna apparatus shown in FIG. 6 differs from the antenna apparatus shown in FIG. 5 in that the focal length of the dielectric lens 4A and the layout of components of the optical system of the antenna apparatus are selected to reduce the diameter of the radio wave beam radiated from the dielectric lens 4A is progressively reduced farther forwardly from the automobile.

Since the diameter of the radio wave beam radiated from the dielectric lens 4A is reduced farther forwardly from the automobile to focus the radio wave beam on a possible target automobile that precedes the automobile, the antenna apparatus can achieve a higher resolution in a lateral azimuth direction transverse to the direction in which the automobile is running. The higher resolution, on the other hand, is liable to reduce the scanning range in which the radio wave beam can detect targets ahead of the motor vehicle. However, the angle of facets of the polygonal mirror 3B may be changed to make up for the reduction in the scanning range with a mechanical scanning process for the radio wave beam.

Depending on the detected distance up to a target forward of the automobile, the data processor 7 controls the lens displacing mechanism 3E to move the focused position of the radiated radio wave beam forwardly or rearwardly as indicated by the arrows in FIG. 6 automatically as the target changes its position.

Figure 7:
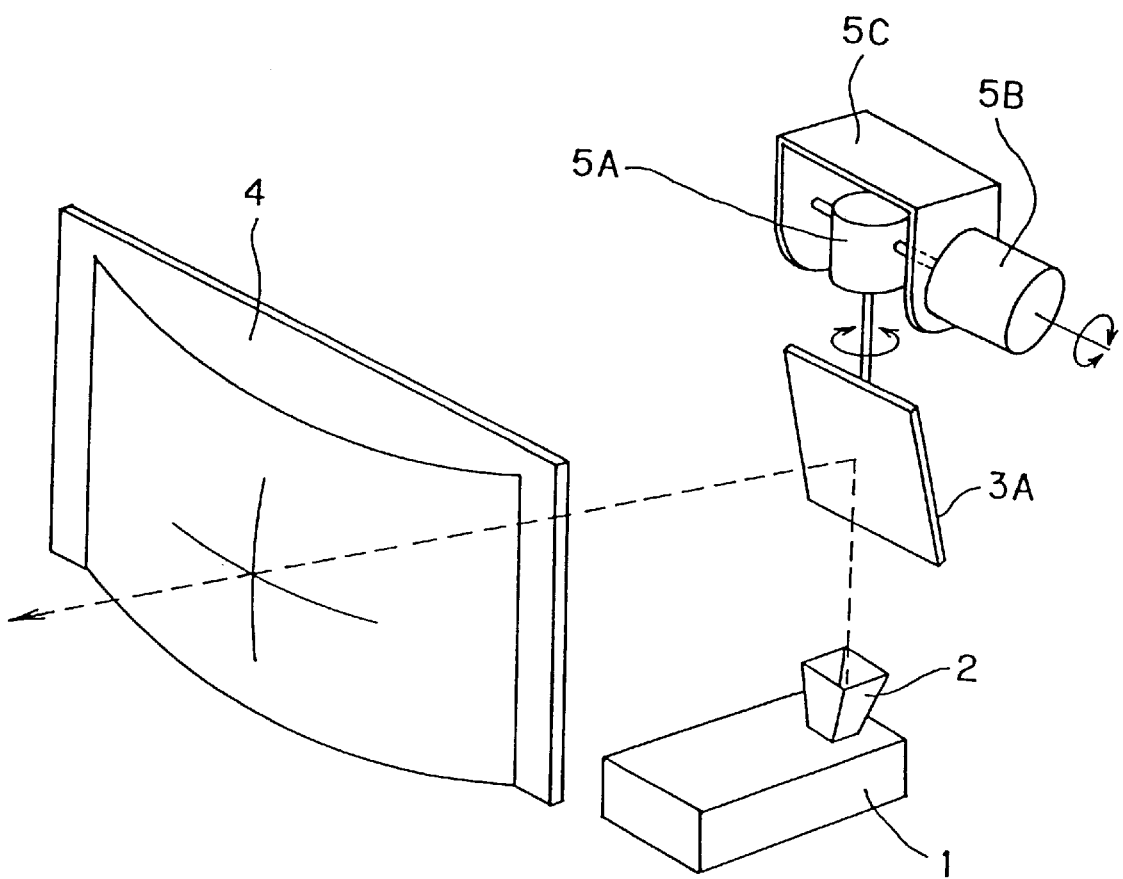
FIG. 7 is a view, partly in block form, of an antenna apparatus according to a further embodiment of the present invention.

FIG. 7 shows an antenna apparatus according to a further embodiment of the present invention. Those parts shown in FIG. 7 which are denoted by reference numerals that are identical to those shown in FIG. 1 are identical to those which have been described above with reference to FIG. 1, and will not be described in detail below. The data processor 7 and the motor driver 6 are omitted from illustration in FIG. 7. The antenna apparatus shown in FIG. 7 differs from the antenna apparatus shown in FIG. 1 in that the reflecting plate 3A is rotatably held by an azimuth motor 5A which rotates the reflecting plate 3A in a horizontal plane, and the azimuth motor 5A is rotatably held by an elevation motor 5B and a holder frame 5C for rotation in a vertical plane. The azimuth motor 5A, the elevation motor 5B, and the holder frame 5C jointly make up a three-dimensional actuating mechanism for causing the reflecting plate 3A to effect three-dimensional movement based on the control of the azimuth angle by the azimuth motor 5A and the control of the angle of elevation by the elevation motor 5B.

When the reflecting plate 3A is three-dimensionally moved by the three-dimensional actuating mechanism, the radio wave beam reflected by the reflecting plate 3A and radiated from the dielectric lens 4 is movable independently in three-dimensional directions. The radiated radio wave beam can be moved independently in three-dimensional directions alternately and repeatedly in cyclic periods depending on either running conditions of the automobile that are detected as changes in the vehicle speed, the steering angle, the yaw rate, the pitching angle, etc., or within a predetermined range.

Figure 8:
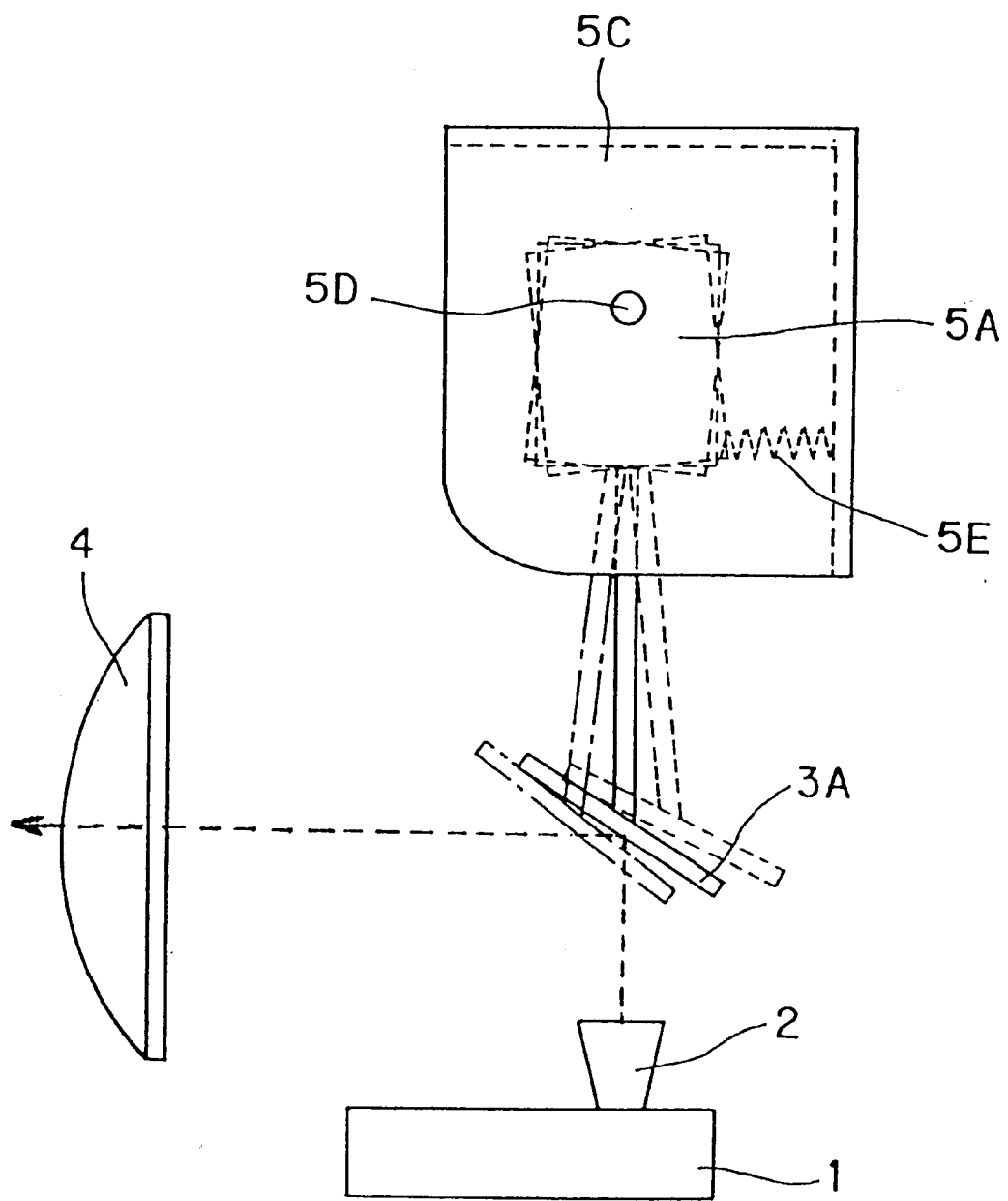
FIG. 8 is a view, partly in block form, of an antenna apparatus according to a still further embodiment of the present invention.

FIG. 8 shows an antenna apparatus according to a still further embodiment of the present invention. Those parts shown in FIG. 8 which are denoted by reference numerals that are identical to those shown in FIG. 7 are identical to those which have been described above with reference to FIG. 7, and will not be described in detail below. The antenna apparatus shown in FIG. 8 differs from the antenna apparatus shown in FIG. 7 in that no elevation motor is employed, and a horizontal support shaft 5D projecting in opposite directions from both sides of the azimuth motor 5A is rotatably supported by the holder frame 5C, with a spring 5E acting between the azimuth motor 5A and a vertical wall of the holder frame 5C.

While the automobile is running at a substantially constant speed with little acceleration or deceleration, the rotatable shaft of the azimuth motor 5A remains substantially vertical as indicated by the solid lines in FIG. 8 due to the moment developed around the horizontal support shaft 5D under the weight of the azimuth motor 5A and the reflecting plate 3A. Therefore, the radio wave beam reflected by the reflecting plate 3A and radiated from the dielectric lens 4 remains substantially parallel to the road surface or crosses the road surface at a position spaced forwardly from the automobile by a suitable distance.

When the automobile is accelerated, the azimuth motor 5A and the reflecting plate 3A are angularly displaced rearwardly as indicated by the dotted lines in FIG. 8, so that the radio wave beam reflected by the reflecting plate 3A and radiated from the dielectric lens 4 tends to be directed downwardly. At the same time, since the automobile is liable to nose up, the radiated radio wave beam tends to be directed upwardly. Accordingly, these downward and upward tendencies of the radiated radio wave beam cancel each other, with the result that the radiated radio wave beam remains substantially parallel to the road surface or crosses the road surface at a position spaced forwardly from the automobile by a suitable distance.

When the automobile is decelerated, the azimuth motor 5A and the reflecting plate 3A are angularly displaced forwardly as indicated by the dot-and-dash lines in FIG. 8, so that the radio wave beam reflected by the reflecting plate 3A and radiated from the dielectric lens 4 tends to be directed upwardly. At the same time, since the automobile is liable to nose down, the radiated radio wave beam tends to be directed downwardly. Accordingly, these upward and downward tendencies of the radiated radio wave beam cancel each other, with the result that the radiated radio wave beam remains substantially parallel to the road surface or crosses the road surface at a position spaced forwardly from the automobile by a suitable distance.

The antenna apparatus according to the above embodiments are used for both transmitting and receiving radio beam waves. However, the antenna apparatus may be used as a transmission or reception antenna apparatus by replacing the transmitter/receiver 1 with a transmitter or a receiver.

The reflecting plate 3A is shown as having a flat reflecting surface, but may have a curved reflecting surface such as a paraboloid or hyperboloid of revolution.

The antenna apparatus have been described as being typically incorporated in an FM radar system. However, the antenna apparatus may be incorporated in radar system such as a pulse radar system, an AM radar system, or the like.

The dielectric lens antenna has been described as being made of PTFE or alumina. However, the dielectric lens antenna may be made of acrylic resin, polycarbonate resin, or the like.

The dielectric lens antenna may be replaced with a suitable lens antenna such as a path-length lens antenna (magnetic-plane metal-plate lens antenna) or the like.

The antenna apparatus according to the present invention have been described as radiating millimeter-wave radio wave beams. However, the antenna apparatus may be used to radiate radio wave beams in a frequency range from 10 GHz to 300 GHz.

The antenna apparatus according to the present invention may be mounted on other movable vehicles such as ships, airplanes, etc. than automobiles, or installed as fixed antenna apparatus on land or sea.

The antenna apparatus according to the present invention have the reflecting member disposed between the primary radiator and the lens antenna such as a dielectric lens antenna for mechanically scanning the radio wave beam. The reflecting member which is employed is small in size, inexpensive to manufacture, and can operate at a high speed. Accordingly, the antenna apparatus are also small in size, inexpensive to manufacture, and can operate at a high speed.

The antenna apparatus according to the present invention employ the lens antenna such as a dielectric lens antenna instead of a reflecting mirror. Inasmuch as a mechanism for actuating such a reflecting mirror is not required to be placed in the path of the radio wave beam, the antenna apparatus have good beam radiation characteristics.

Furthermore, because the diameter of the radiated radio wave beam may be reduced along the beam radiating direction by the lens antenna such as a dielectric lens antenna, the antenna apparatus can achieve a high resolution in the lateral azimuth direction transverse to the direction in which the radio wave beam is radiated.

Although certain preferred embodiments of the present invention have been shown and described in detail, it should be understood that various changes and modifications may be made therein without departing from the scope of the appended claims.

What is claimed is:

1. An antenna apparatus comprising:
   a primary radiator for radiating a high-frequency radio wave beam;
   a reflecting member for reflecting said radio wave beam;
   an actuating mechanism for actuating said reflecting member; and
   a lens for converging the radio wave beam reflected by said reflecting member to reduce an angle of divergence of the radio wave beam.

2. An antenna apparatus according to claim 1, for use on a motor vehicle, wherein said actuating mechanism comprises a rotating mechanism for changing an angle of said reflecting member depending on a turn of the motor vehicle.

3. An antenna apparatus according to claim 2, wherein said turn of the motor vehicle is detected based on a steering angle and a yaw rate of the motor vehicle.

4. An antenna apparatus according to claim 1, wherein said actuating mechanism comprises a rotating mechanism for changing an angle of said reflecting member depending on a movement of a detected target.

5. An antenna apparatus according to claim 4, for use on a motor vehicle, wherein said movement of the detected target is represented by a relative speed between the motor vehicle and the target, a distance between the motor vehicle and the target, and a position of the target with respect to the motor vehicle.

6. An antenna apparatus according to claim 1, wherein said reflecting member comprises a polyhedral body having a plurality of reflecting facets inclined at different angles to planes containing an axis about which said polyhedral body is rotatable.

7. An antenna apparatus according to claim 6, for use on a motor vehicle, wherein said actuating mechanism comprises means for selecting one of said reflecting facets to reflect the radio wave beam depending on a tilted condition of the motor vehicle based on a detected pitching angle of the motor vehicle.

8. An antenna apparatus comprising:
   a primary radiator for radiating a high-frequency radio wave beam;
   an auxiliary lens for converging the radio wave beam radiated by said primary radiator to reduce a diameter of the radio wave beam;
   a reflecting meter for reflecting said radio wave beam converged by said auxiliary lens;
   an actuating mechanism are actuating said reflecting member; and
   a lens for converging the radio wave beam reflected by said reflecting member to reduce an angle of divergence of the radio wave beam.

9. An antenna apparatus according to claim 8, for use on a motor vehicle, further comprising a lens displacing mechanism for displacing said auxiliary lens in a direction of travel of the radio wave beam depending on a running condition of the motor vehicle.

10. An antenna apparatus according to claim 9, wherein said running condition comprises a speed of the motor vehicle.

11. An antenna apparatus comprising:
    a primary radiator for radiating a high-frequency radio wave beam;
    a reflecting member for reflecting said radio wave beam;
    an actuating mechanism for actuating said reflecting member; and
    a main lens for converging the radio wave beam reflected by said reflecting member to reduce a diameter of the radio wave beam progressively along a direction in which the radio wave beam is propagated for thereby focusing the radio wave beam forwardly of the main lens.

12. An antenna apparatus comprising:
    a primary radiator for radiating a high-frequency radio wave beam;
    an auxiliary lens for converging the radio wave beam radiated by said primary radiator to reduce a diameter of the radio wave beam;
    a reflecting member for reflecting the radio wave beam converged by said auxiliary lens;
    an actuating mechanism for actuating said reflecting member; and
    a main lens for converging the radio wave beam reflected by said reflecting member to reduce a diameter of the radio wave beam progressively along a direction in which the radio wave beam is propagated for thereby focusing the radio wave beam, forwardly of the main lens.

13. An antenna apparatus according to claim 12, for use on a motor vehicle, further comprising a lens displacing mechanism for displacing said auxiliary lens in a direction of travel of the radio wave beam depending on a running condition of the motor vehicle.

14. An antenna apparatus according to claim 13, wherein said running condition comprises a speed of the motor vehicle.

15. An antenna apparatus according to any one of claims 8, 11, and 12, for use on a motor vehicle, wherein said actuating mechanism comprises a rotating mechanism for changing an angle of said reflecting member depending on a turn of the motor vehicle.

16. An antenna apparatus according to claim 15, wherein said turn of the motor vehicle is detected based on a steering angle and a yaw rate of the motor vehicle.

17. An antenna apparatus according to any one of claims 8, 11, and 12, wherein said reflecting member comprises a polyhedral body having a plurality of reflecting facets inclined at different angles to planes containing an axis about which said polyhedral body is rotatable.

18. An antenna apparatus according to claim 17, for use on a motor vehicle, wherein said actuating mechanism comprises means for selecting one of said reflecting facets to reflect the radio wave beam depending on a tilted condition of the motor vehicle based on a detected pitching angle of the motor vehicle.

* * * * *